United States Patent
Solismaa

(10) Patent No.: US 9,051,689 B2
(45) Date of Patent: Jun. 9, 2015

(54) METHOD FOR PRECIPITATING CALCIUM CARBONATE

(75) Inventor: Paivi Solismaa, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 13/814,413

(22) PCT Filed: Aug. 16, 2011

(86) PCT No.: PCT/FI2011/050716
§ 371 (c)(1),
(2), (4) Date: Feb. 5, 2013

(87) PCT Pub. No.: WO2012/022836
PCT Pub. Date: Feb. 23, 2012

(65) Prior Publication Data
US 2013/0126116 A1    May 23, 2013

(30) Foreign Application Priority Data
Aug. 20, 2010 (FI) .................. 20105868

(51) Int. Cl.
*D21H 17/70* (2006.01)
*C01F 11/18* (2006.01)
*D21H 17/67* (2006.01)

(52) U.S. Cl.
CPC ............. *D21H 17/675* (2013.01); *C01F 11/18* (2013.01); *C01F 11/182* (2013.01); *C01P 2004/03* (2013.01)

(58) Field of Classification Search
CPC ........ D21C 9/004; D21C 9/001; D21C 9/007; D21H 17/675; D21H 17/70; D21H 19/38; D21H 19/385; D21H 17/63; D21H 11/20; C01F 11/18; C01F 11/182; C01P 2004/03
USPC ........ 162/9, 141, 149, 158, 181.1, 181.4, 182
See application file for complete search history.

(56) References Cited

U.S. PATENT DOCUMENTS

| 5,223,090 A | 6/1993 | Klungness et al. |
| RE35,460 E * | 2/1997 | Klungness et al. ............... 162/9 |

(Continued)

FOREIGN PATENT DOCUMENTS

| DE | 10 2006 003 721 A1 | 1/2007 |
| DE | 10 2007 029 686 A1 | 1/2009 |

(Continued)

OTHER PUBLICATIONS

Dec. 9, 2011 International Search Report issued in International Application No. PCT/FI2011/050716.

(Continued)

*Primary Examiner* — Jose Fortuna
(74) *Attorney, Agent, or Firm* — Oliff PLC

(57) ABSTRACT

The invention relates to a method for precipitating calcium carbonate, in which method calcium hydroxide is introduced to a fiber suspension containing cellulose-containing fibers, the calcium hydroxide is allowed to attach onto the surfaces of fibers for a pre-determined time, and the aqueous suspension of calcium hydroxide and fibers is brought into contact with carbon dioxide for precipitating the calcium carbonate. The invention also relates to a corresponding system for precipitating calcium carbonate in connection with cellulose-containing fibers. In addition, the invention relates to a fibrous product, which comprises pulp material produced by said method and comprising calcium carbonate.

9 Claims, 3 Drawing Sheets

(56) References Cited

U.S. PATENT DOCUMENTS

| | | | |
|---|---|---|---|
| 5,679,220 | A | 10/1997 | Matthew et al. |
| 5,731,080 | A | 3/1998 | Cousin et al. |
| 6,599,390 | B2 * | 7/2003 | Rheims et al. .................... 162/9 |
| 6,627,042 | B2 * | 9/2003 | Holik ............................ 162/123 |
| 7,070,677 | B2 * | 7/2006 | Henricson ....................... 162/63 |
| 7,179,347 | B2 * | 2/2007 | Rheims et al. .................... 162/9 |
| 8,282,780 | B2 * | 10/2012 | Maijala et al. ................ 162/243 |
| 8,480,855 | B2 * | 7/2013 | Maijala et al. ................ 162/243 |
| 2001/0045265 | A1 * | 11/2001 | Holik ............................ 162/123 |
| 2003/0094252 | A1 * | 5/2003 | Sundar et al. ................. 162/128 |
| 2003/0121624 | A1 * | 7/2003 | Rheims et al. .................... 162/9 |
| 2004/0084161 | A1 * | 5/2004 | Heinzmann ..................... 162/65 |
| 2004/0154771 | A1 | 8/2004 | Rheims et al. |
| 2007/0068640 | A1 * | 3/2007 | Pfalzer et al. ..................... 162/9 |
| 2007/0119561 | A1 * | 5/2007 | Doelle et al. ............... 162/181.2 |
| 2007/0131361 | A1 | 6/2007 | Doelle et al. |
| 2007/0151681 | A1 * | 7/2007 | Doelle ............................. 162/9 |
| 2007/0272376 | A1 * | 11/2007 | Maijala et al. .................... 162/9 |
| 2008/0210391 | A1 * | 9/2008 | Pfalzer et al. ..................... 162/4 |
| 2009/0056888 | A1 * | 3/2009 | Doelle et al. .................... 162/10 |
| 2009/0229772 | A1 | 9/2009 | Riou |
| 2010/0212853 | A1 * | 8/2010 | Klungness ................. 162/181.4 |
| 2013/0062030 | A1 * | 3/2013 | Imppola et al. ............ 162/181.4 |
| 2013/0126116 | A1 * | 5/2013 | Solismaa ................... 162/181.2 |

FOREIGN PATENT DOCUMENTS

| | | |
|---|---|---|
| EP | 0 791 685 A2 | 8/1997 |
| EP | 1 297 220 B1 | 10/2004 |
| FI | 100670 B | 1/1998 |
| FI | 120463 B | 10/2009 |
| WO | WO 2005/005725 A1 | 1/2005 |
| WO | WO 2005/005726 A1 | 1/2005 |
| WO | WO 2009/000346 A1 | 12/2008 |
| WO | WO 2009/103854 | 8/2009 |

OTHER PUBLICATIONS

Jun. 3, 2011 Search Report issued in Finnish Patent Application No. 20105868 (with translation.).

"Lime water;" Wikipedia: The Free Encyclopedia; Wikimedia Foundation, Inc.; Apr. 2011; http://en.wikipedia.org/wiki/Milk_of_lime.

First Office Action dated Jun. 17, 2014 from Chinese Patent Application No. 201180040335.0 (with English-language translation).

Feb. 26, 2015 Search Report issued in European Patent Application No. 11 817 817.7.

Subramanian et al., "Calcium Carbonate—Cellulose Fibre Composites; The Role of Pulp Refining," Paper Technology, 2006, vol. 47, No. 8, pp-27-31.

Subramanian et al., "The Role of Refining in Calcium Carbonate Composite Fillers," 91st Annual Meeting Preprints—Book A, Feb. 8, 2005, Pulp and Paper Technical Association of Canada, Montreal, pp. A17-A21.

Apr. 14, 2015 Office Action issued in Finnish Patent Application No. 20155024.

* cited by examiner

Reference

|  |  | REF | TP11 |
|---|---|---|---|
| Grammage | g/m² | 80,9 | 79,6 |
| Ash 525 °C | % | 25,06 | 26,34 |
| Light scattering coefficient | m²/kg | 61,5 | 75,2 |
| Opacity | % | 88,9 | 91,2 |
| Thickness | μm | 110 | 108 |
| Tensile index | Nm/g | 34,5 | 20,5 |
| Bond strength SB | J/m² | 208 | 104 |
| ISO brightness | % | 88,7 | 89,0 |
| Air permeability Bendtsen | ml/min | 1102 | 1150 |
| Roughness Bendtsen 150/1 | ml/min | 261 | 212 |

METHOD FOR PRECIPITATING CALCIUM CARBONATE

FIELD OF THE INVENTION

The invention relates to a method and a system for precipitating calcium carbonate. In addition, the invention relates to a product comprising calcium carbonate.

BACKGROUND OF THE INVENTION

PCC is precipitated calcium carbonate. In industry it is typically produced by allowing calcium hydroxide $Ca(OH)_2$ to react with a precipitating agent, such as, for example, carbon dioxide $CO_2$, wherein the resulting product is precipitated calcium carbonate (PCC). The calcium hydroxide $Ca(OH)_2$ used in the reaction may be produced, for example, by slaking burnt lime CaO with water, wherein the reaction produces calcium hydroxide.

Typically calcium carbonate $CaCO_3$ is precipitated in industry by introducing gas containing carbon dioxide into a suspension of calcium hydroxide in water, which is also known as milk of lime. Calcium carbonate precipitated in such a manner may be used, for example, as paper filler or coating pigment. By changing process conditions it is possible to influence the crystalline and granular form of precipitated calcium carbonate and its properties.

The use of precipitated calcium carbonate in paper improves the optical properties and the printing properties of paper, and in addition, it typically reduces production costs per manufactured ton of paper. U.S. Pat. No. 5,679,220, U.S. Pat. No. 5,731,080 and EP-1297220 disclose methods of prior art for precipitating calcium carbonate in the fibre raw material of paper.

Increasing the calcium carbonate content of paper or paperboard typically results in cost savings, which are mainly due to the decreasing percentage of the amount of more expensive fibre material. Therefore, it is generally an aim in paper manufacture to introduce as much filler in paper as possible. Increasing filler content according to prior art, however, typically causes deterioration in the strength properties of paper. Especially decreasing the wet strength of paper may cause significant problems in a paper machine. Therefore, in industry there is a need for a solution that would facilitate increasing the filler content of a product being produced while not decreasing the wet strength as significantly as in solutions of prior art.

BRIEF SUMMARY OF THE INVENTION

A purpose of the present invention is to provide a solution for the problem presented above for increasing the filler content. For this purpose, a new method and system for precipitating calcium carbonate is provided. In addition, paper, fibre composite construction and paperboard comprising calcium carbonate is provided.

The invention is based on a new method, where calcium carbonate is precipitated from a mixture of fibre material and calcium hydroxide so that at least a part of calcium carbonate precipitates directly onto the surface of fibres. A purpose of the method according to the invention is to facilitate the production of a fibrous product so that increasing the filler content in a fibrous product in comparison to papers manufactured by conventional methods may be possible. According to an advantageous embodiment the wet strength properties of the product being produced do not decrease by the addition of filler as much when producing paper or paperboard by the method according to the invention as when producing paper or paperboard according to prior art. According to another advantageous embodiment the opacity of the product being produced improves in comparison to products according to prior art. Therefore, for example, the opacity of a product produced of birch pulpwood may be nearly as good as the opacity of a product manufactured from eucalyptus or acacia pulpwood by a conventional method.

The method for precipitating calcium carbonate according to the invention is primarily characterized in that the method comprises at least the following steps:
  calcium hydroxide, for example aqueous suspension of calcium hydroxide, is introduced to a fibre suspension comprising cellulose-containing fibres,
  calcium hydroxide is allowed to attach onto the surfaces of fibres for a pre-determined time period, and
  bringing the aqueous suspension of calcium hydroxide and fibres into contact with carbon dioxide for precipitating calcium carbonate.

The system for precipitating calcium carbonate according to the invention is primarily characterized in that the system comprises:
  first adding elements for introducing calcium hydroxide to the fibres,
  means for arranging a pre-determined delay time after introducing calcium hydroxide, and
  second adding elements for introducing carbon dioxide in the fibre-calcium hydroxide mixture after the pre-determined delay time for precipitating calcium carbonate.

The product according to the invention is primarily characterized in that it is a fibrous product comprising calcium carbonate and produced by the method according to the invention. Advantageously the product according to the invention is paper, fibre composite construction or paperboard, which is produced by some method according to the invention. According to an advantageous example the filler content of the product according to the invention is at least 15%.

In the method according to the invention calcium hydroxide is allowed to attach onto the surfaces of fibres for long enough before calcium hydroxide is precipitated to calcium carbonate by carbon dioxide. Therefore, carbon dioxide is introduced to the main flow typically only after a certain delay time from introducing calcium hydroxide. According to an advantageous embodiment calcium hydroxide is allowed to attach onto the surfaces of fibres for the time period it takes for fibre pulp to travel from refining feeding tank through refiners to the actual pulp feeding tank.

One advantage of the method and system according to the invention is the simplicity of the method. It is possible to implement the method and the system mainly with existing process devices, wherein only relatively small additional investments are needed.

By the method according to the invention calcium carbonate may be precipitated either in a batch process or in a continuous process. Preferably, the precipitation according to the invention is carried out in a continuous process.

DESCRIPTION OF THE DRAWINGS

In the following, the invention will be described in more detail with reference to the appended drawings, in which.

DETAILED DESCRIPTION OF THE INVENTION

Figure 1:
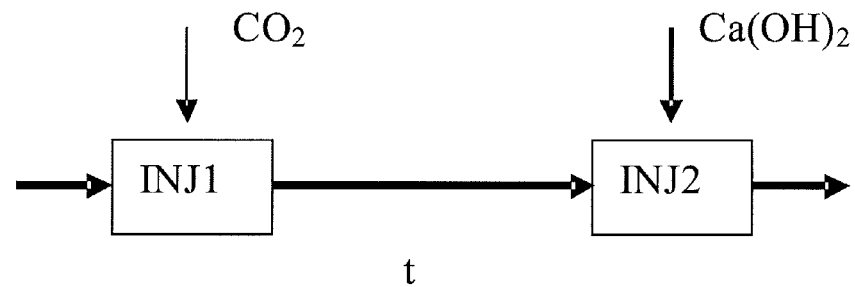
FIG. 1 shows a method for precipitating calcium carbonate according to prior art in a schematic view.

The product according to the invention is preferably a fibrous product, such as, for example, paper, paperboard or fibre composite construction. According to an advantageous embodiment a product produced by the method according to the invention is fine paper, which preferably comprises birch pulpwood.

A reactive mineral substance used is calcium hydroxide, advantageously an aqueous suspension of calcium hydroxide. An aqueous suspension of calcium hydroxide is also called milk of lime. A precipitating chemical used is preferably carbon dioxide, such as, for example, gas containing carbon dioxide.

The precipitation of calcium hydroxide $Ca(OH)_2$ according to the invention at least partly onto the surface of fibres as PCC for creating a fibrous product may be carried out either in a batch process or in a continuous process. In a batch process aqueous suspension of calcium hydroxide is first introduced to a fibrous pulp suspension. The calcium hydroxide is allowed to attach for a pre-determined delay time onto the surface of fibres. After this pre-determined time, carbon dioxide $CO_2$ is led to the aqueous suspension of fibre and calcium hydroxide. Thus, calcium hydroxide precipitates to calcium carbonate so that calcium carbonate attaches onto the surfaces of fibres. Carbon dioxide is led to the reactor advantageously as long as substantially all milk of lime has precipitated.

According to an advantageous embodiment of the invention, instead of batch process, continuous precipitations is used in the method (Continuous Precipitated Calcium Carbonate, CPCC). In continuous precipitation, such as in the so-called tube reactor, calcium carbonate can be precipitated by using the method according to the invention so that it attaches at least partly onto the surface of fibres. In the method calcium hydroxide as, for example, aqueous suspension is first introduced to the fibrous pulp suspension. After this the calcium hydroxide is allowed to attach for a pre-determined delay time onto the surface of fibres. After a pre-determined time carbon dioxide is introduced to this mixture containing at least milk of lime and fibres, advantageously to the flow of said mixture. Carbon dioxide is advantageously introduced by injecting. When introducing carbon dioxide by injecting it is substantial that by injecting a strong mixing is produced, which enables an almost complete mixing of carbon dioxide and fibre-milk of lime-mixture in a few seconds, as a result of which calcium carbonate may precipitate onto the surfaces of fibres quickly, advantageously in less than 5 seconds.

In view of the precipitation reaction according to the invention it is substantial that the different elements of the mixture, which comprise at least cellulose-containing fibres, water and calcium hydroxide, have time to be in contact with each other long enough for at least a part of calcium hydroxide to attach onto the surface of fibres. During this delay time calcium hydroxide may react chemically with carboxyl groups on the surface of a fibre, thus forming a strong attachment between the fibre and precipitated calcium hydroxide. By proceeding in this manner, calcium hydroxide is precipitated to calcium carbonate especially onto the surfaces of fibres when calcium hydroxide is allowed to react with carbon dioxide. The natural pH of about 11-12 of calcium hydroxide is suitable for the reaction, and therefore it is typically not necessary to add special pH adjustment chemicals in the mixture.

According to an advantageous embodiment the fibres and calcium hydroxide should be in the same space for at least a minute before carbon dioxide is led to the reactor. According to an advantageous embodiment the fibres and calcium hydroxide should be in the same space for at least 100 seconds or at least 1.5 minutes, preferably at least 5 minutes before the introduction of carbon dioxide. According to an advantageous embodiment the above-identified delay time is approximately 15 minutes.

By dissolving the fibre suspension according to the invention in milk of lime for long enough and then by precipitating milk of lime with carbon dioxide to calcium carbonate onto fibres, it is possible to reach especially small calcium carbonate crystals. This way the average size of produced crystals is approximately 1.5 μm, while the average size of crystals produced by a prior art method in corresponding conditions is around 2.2 μm. It is also substantial that the slope of the size distribution of calcium carbonate crystals produced by the method according to the invention is small; the d30/d70 value of a product produced by a method according to the invention may be reduced even to 28 while the corresponding value of a product produced according to a prior art method is 47. In other words, a part of the produced crystals may be normal-sized PCC, but correspondingly, the crystals may also include very small crystals, approximately of size 1 μm.

Due to the method according to the invention the fibre is covered at least partly, preferably mostly, by PCC by the effect of the formed small calcium carbonate crystals bound onto the surface of a fibre. In other words, a calcium carbonate layer precipitated by the method according to the invention, so to say, coats the fibre.

The invention is characterized in that calcium hydroxide $Ca(OH)_2$ reacts with the surface of the fibre by attaching onto it. When carbon dioxide $CO_2$ is introduced to the mixture, especially small crystals are formed because the crystal size of the crystals being formed cannot increase as the calcium hydroxide is attached onto the surface of the fibre.

According to an exemplary embodiment the method according to the invention is used to form not only cubic calcium carbonate crystals but also prismatic calcium carbonate crystals. Prismatic crystals may be formed because calcium hydroxide is attached onto the surface of fibres by precipitating substantially to its attaching point. Calcium carbonate precipitated by a conventional method comprises substantially only cubic crystals, because then calcium hydroxide and carbon dioxide are available in excess and carbon dioxide is not attached onto the surfaces of fibres.

Surprisingly it has been noted that a mixture of fibre and calcium carbonate produced by the method according to the invention typically has better wet strength values with a specific PCC filler amount in comparison to a mixture of fibre and calcium carbonate produced in a conventional manner. In paper manufacture, and often especially in fine paper manufacture the substantial wet tensile strength has increased substantially when producing paper or paperboard according to the invention in comparison to conventional production methods. Due to the improvement of wet tensile strength it is possible to introduce into the pulp suspension substantially larger amounts of fillers than previously, which typically has the effect of lowering paper and paperboard manufacturing costs. The improved wet strength is especially useful when using birch or some other fibre material comprising a relatively poor wet strength as the main pulp raw material in, for example, fine paper manufacture.

The properties of the product according to the present invention may change in the manner described above, because in a product produced by the method according to the invention the particle size of PCC is on average smaller than in a product produced by a method according to prior art. As a result of this the wet strength of the product being produced typically improves when e.g. the friction between fibres increases. Scattering of light and opacity also improve, because there are more light scattering surfaces. However, the dry strength of the product being produced typically weakens, because the fibres cannot form hydrogen bonds in the same manner as in production methods according to prior art, as the surface of fibres has, so to say, been coated by PCC. The decrease in dry strength does not, however, typically become problematic in production.

Figures 4A, 4B:
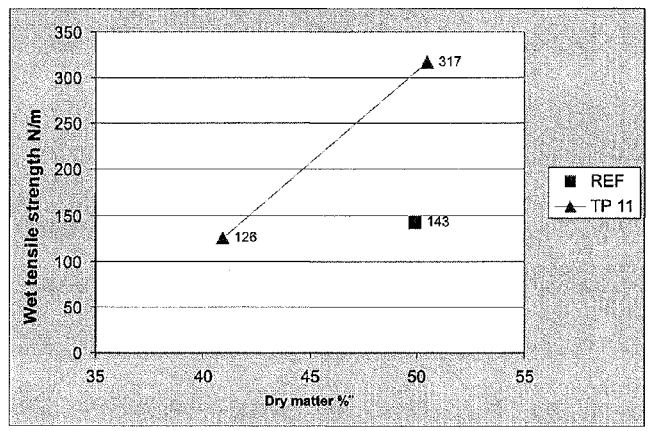
FIGS. 4a and 4b show some test run results.

FIGS. 4a and 4b show some examples of test run results. The figures show the effect of processing according to an embodiment of the invention in specific properties of the product being produced. Both pulps, i.e. the reference pulp "REF" and test point "TP11" are substantially the same birch pulpwood pulp. In reference point REF the precipitated calcium carbonate (PCC) is formed in the presence of fibres according to prior art without the delay of lime milk processing. In test point TP11 the precipitated calcium carbonate (PCC) is, in turn, formed by a method according to the invention, where calcium hydroxide is first introduced among the fibres and the delay time according to the invention is used between the calcium hydroxide introduction and carbon dioxide introduction.

As can be seen in FIG. 4a, the wet tension strength of a product produced by a method according to the invention has already been on almost the same level in an approximately 10% lower dry matter content as the wet tension strength of the reference point produced by a method according to prior art. In an substantially same dry matter content the wet tension strength of a product produced by a method according to the invention has been approximately 100% higher than that of a product produced by a prior art method.

FIG. 4b, in turn, shows in table format some test run results of the properties of test point TP11 in comparison to the properties of a reference point product REF produced by a prior art method. As can be seen from FIG. 4b, the product TP11 produced by the method according to the invention has, in addition to the wet tension strength seen in FIG. 4a, also an improved light scattering coefficient and opacity in comparison to the reference product REF. However, in test point TP11 the dry strength has, as expected, weakened in comparison to the reference point.

In addition to the method according to the invention having advantageous effects on the wet tension properties of the product being produced, it is possible to decrease the dusting of the final product by the method according to the invention. This is due to the PCC produced by the method according to the invention being mainly attached to the fibre. Decreased dusting, for its part, facilitates introducing an increased filler content to the final product, since normally the increase of filler content above a certain amount causes problematic dusting in the final product, such as paper or paperboard.

Test runs have also shown an improvement in the light scattering properties of the product produced by the method according to the invention. This is significant from the point of view of especially the usability of birch pulp, since the light scattering properties of birch are typically weaker than the light scattering properties of other hardwood, such as, for example, acacia and eucalyptus.

When precipitating calcium carbonate to a product by the method according to the invention, the crystals formed during precipitation are typically divided substantially all over the surface of the fibre. This prevents the formation of too large, unadvantageous crystals and attaches the formed crystals better onto the surface of the fibre.

The method according to the present invention may be implemented, for example, in connection with existing paper and paperboard mills relatively cost-effectively. According to an example new structural parts in the method according to the present invention may include, for example, a tank for the relatively long mixing time of lime of milk and fibre suspension, as well as an feeding solutions for carbon dioxide (for example the so-called TrumpJet®). According to another advantageous example it is possible to create a sufficient delay between the introduction of calcium hydroxide and fibres, as well as carbon dioxide in connection with pulp processing also entirely without new tank investments. According to an example, calcium hydroxide may be mixed to the fibres before a refiner, for example in the tank preceding the refiner, in which case carbon dioxide may be introduced after the refiners, for example in the tank following the refiners. In other words, the delay in, for example, the refining line may be sufficient for attaching calcium hydroxide onto the surfaces of fibres before the precipitation taking place by the effect of carbon dioxide. In addition, the refining phase in the solution according to this example may boost the chemical reaction between the calcium hydroxide and the fibre.

The fibre mixture used in the method according to the present invention may be normal pulp suspension, where the fibre portion is mainly formed of hardwood. Thus, according to an advantageous example the fibre portion of the fibre suspension comprises mainly birch. The fibre portion of the pulp suspension may comprises also softwood instead of, or in addition to, hardwood. In such a case, the fibre portion may be even entirely softwood. According to an advantageous example the portion of hardwood is not more than 40 wt-%, preferably not more that 30 wt-% of fibres, because thus the benefit from the present invention, especially the benefit of increased wet strength is typically emphasized. Irrespective of the wood type the degree of refining of the fibre suspension being used may vary from slightly refined fibre suspension to a very refined fibre suspension.

The following examples show test runs where the method according to the invention has been used, as well as test results from a product produced by the method according to the present invention, in this case paper sheets.

Example 1

Figure 2:
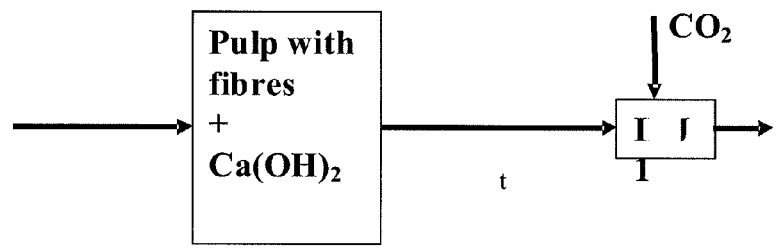
FIG. 2 shows a continuous method for precipitating calcium carbonate according to the present invention in a schematic view.

The test runs were carried out in a continuous tube reactor. FIG. 2 shows the method being used in a schematic vied. The pulp, which was normally refined birch pulp, remained in the tank in an aqueous suspension of calcium hydroxide for about 100 minutes. Carbon dioxide was introduced after this to the mixture by using TrumpJet® equipment. The temperature of the process was about 50° C. and the pressure in the reactor was about 4.1 bar. The flow rate of the main process flow in the tube reactor was about 2 Vs. In FIGS. 1-2 "INJ" refers to the introduction of a component, which in the test runs took place by injection.

In addition to pulp suspensions and products produced by the method according to the invention, reference samples were produced, which were produced with otherwise the same parameters, but in the method carbon dioxide was first injected to the water flow and after this, milk of lime. FIG. 1 shows the method used in the reference samples in a schematic view.

The particle size of the PCC formed in the test point according to the invention was very small in comparison to reference samples and the particles covered the surface of fibres substantially entirely. The median particle size was only about 1.5 µm for the PCC produced by the method according to the invention, while in the reference point the median particle size was about 2.2 µm.

Paper sheets were made from the produced pulps. The properties of paper sheets produced by the method according to the invention differed from the properties of paper sheets produced from fibre suspension consisting of PCC precipitated in connection with fibre according to prior art in that the paper produced from the fibres suspension implemented by the method according to the invention had in at least one reference line a substantially better wet tension strength (317 N/m vs. 143 N/m in dry matter 50%). The paper produced from fibre suspension implemented by the method according to the invention also had a clearly better light scattering coefficient (75 m$^2$/kg vs. 61 m$^2$/kg), as well as a better opacity (91.2% vs. 88.9%). The dewatering properties were substantially the same when using both production methods. The realized differences in properties were mainly due to a chemical reaction between fibres and calcium hydroxide.

Example 2

A test run was performed with a total of ten test points, four test points 1-4 of which were reference points, where the fibres did not have a delay with milk of lime, or the delay was short. In addition, there were six actual test run test points according to the method according to the invention, i.e. test points 5-10, where the method according to FIG. 2 was used.
Test Setting
Reference Points:

The fibres used in all reference points were birch cellulose fibres. Carbon dioxide and milk of lime were dispensed in the test points 1 to 4 (reference points) listed below in the following manner:
1. carbon dioxide dispensed 4 s before milk of lime,
2. milk of lime dispensed 4 s before carbon dioxide
3. carbon dioxide and milk of lime dispensed substantially simultaneously, and
4. milk of lime dispensed 22 s before carbon dioxide.

Test Points:

In three of the actual test points 5 to 10 birch cellulose fibres (test points 5 to 7) were used, and in three, pine cellulose fibres (test points 8 to 10). Milk of lime was dispensed into the fibres, after which carbon dioxide was introduced with a 15 to 125 min dispensing delay to the test points in the manner described below, where test points 5 to 7 comprise birch pulp and test points 8 to 10 pine pulp:
5. milk of lime introduced to birch fibres 15 minutes before introducing carbon dioxide,
6. milk of lime introduced to birch fibres 45 minutes before introducing carbon dioxide,
7. milk of lime introduced to birch fibres 105 minutes before introducing carbon dioxide,
8. milk of lime introduced to pine fibres 15 minutes before introducing carbon dioxide,
9. milk of lime introduced to pine fibres 45 minutes before introducing carbon dioxide, and
10. milk of lime introduced to pine fibres 125 minutes before introducing carbon dioxide.

The fibre material used in all reference points 1-4 and test points 5-7 was birch pulp in consistency 1.13%. The pine pulp used as fibre material in test points 8-10 was in consistency 0.9%. The temperature in all test points was about 50° C. and pressure about 3.8 bar. The flow rate of the main process flow in all test points was about 2 l/s.
Results The properties of pulp and a product produced from the pulp were substantially the same in all reference points 1-4. In other words, when introducing milk of lime substantially simultaneously with carbon dioxide or even about 30 seconds before carbon dioxide, the pulp properties were almost the same. The properties of pulp and the product, however, changed notably when moving on to the actual test points 5-10.

Figure 3A:
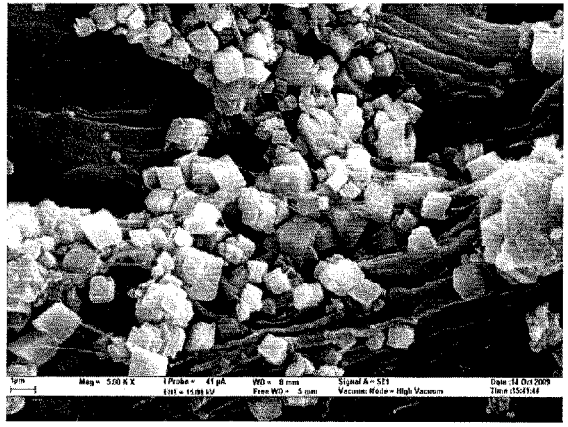
FIG. 3a shows calcium carbonate precipitated among fibres by a method according to prior art.
Figure 3B:
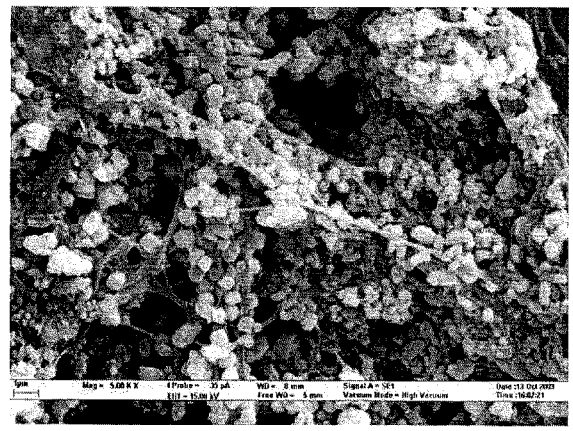
FIG. 3b shows calcium carbonate precipitated among birch pulpwood by a method according to the present invention.
Figure 3C:
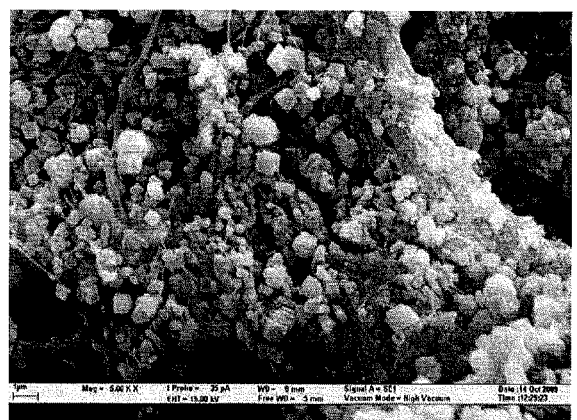
FIG. 3c shows calcium carbonate precipitated among pine pulpwood by a method according to the present invention.

FIGS. 3a-c show precipitated calcium carbonate particles in scanning electron microscope (SEM) images both in the first reference point 1 and in the first birch-containing test point 5 and in the first pine-containing test point 8. FIG. 3a shows a fibre-PCC-mixture taken from reference point 1. FIG. 3b shows a fibre-PCC-mixture taken from test point 5. FIG. 3c shows a fibre-PCC-mixture taken from test point 8. On the basis of the figures it can be noted that the particle size of reference points is significantly larger than the particle size in test points. Similarly, the deviation of particle size was significantly greater in test points than in reference points.

Test sheets were produced from all test points 1-10 with a grammage of about 80 g/m$^2$. Only CPCC produced by a method according to each test point was used as filler in the test point sheets. Pulp ration was always adjusted to 50%/50% birch/pine, i.e. pine or birch without PCC precipitation was introduced in the mixture in the end so that the pulp composition of the sheet was always constant. In other words, the difference was mainly in whether the PCC was introduced with birch pulp or pine pulp.

The light scattering and opacity properties of the product being produced were significantly better in test points 5-10 than in reference points 1-4.

Wet strength values improved substantially in all birch pulp test points 5-7 and in pine pulp test points 8-9. However, in the 125 min test point 10 for pine pulp this improvement in wet strength values was no longer detectable.

Ash retention improved as the delay time between the mixture of lime milk and fibre, and the introductions of carbon dioxide increased, especially when using birch pulp as fibre material. Due to this the ash contents of birch points without filler addition were 21% and of pine points 18%, while the ash contents of reference points were 17%.

It is to be noted that the invention is not limited solely to the examples presented in the figures and in the above description, but the invention may be applied according to the idea of the invention. Therefore, the invention is characterized in what will be presented in the following claims.

The invention claimed is:

1. A method for precipitating calcium carbonate, comprising:
    introducing calcium hydroxide to a fiber suspension comprising cellulose-containing fibers to obtain an aqueous suspension of calcium hydroxide and fibers,
    allowing calcium hydroxide to attach onto the surfaces of fibers for at least approximately 15 minutes before bringing the aqueous suspension of calcium hydroxide and fibers into contact with carbon dioxide, and
    bringing the aqueous suspension of calcium hydroxide and fibers into contact with carbon dioxide in order to precipitate calcium carbonate, by flowing the aqueous suspension of calcium hydroxide and fibers through a tube or line and injecting carbon dioxide into the flowing aqueous suspension of calcium hydroxide and fibers.

2. The method according to claim 1, wherein the fibers comprise hardwood pulp.

3. The method according to claim 1, wherein the precipitation of calcium carbonate occurs in less than 5 seconds after injecting carbon dioxide into the flowing aqueous suspension of calcium hydroxide and fibers.

4. The method according to claim 1, wherein the fibers comprise softwood pulp.

5. The method according to claim 1, wherein the median particle size of the precipitated calcium carbonate is less than 2.0 μm.

6. The method according to claim 1, wherein the median particle size of the precipitated calcium carbonate is less than 1.7 μm.

7. The method according to claim 1, wherein an aqueous suspension of calcium hydroxide is introduced to the fiber suspension.

8. The method according to claim 1, wherein calcium hydroxide is allowed to attach onto the surfaces of fibers for 15 minutes to 125 minutes before the aqueous suspension of calcium hydroxide and fibers is brought into contact with carbon dioxide.

9. The method according to claim 1, wherein the introducing the calcium hydroxide to the fiber suspension occurs in advance of introduction of the aqueous suspension of calcium hydroxide and fibers into a refiner, and wherein the bringing the aqueous suspension of calcium hydroxide and fibers into contact with the carbon dioxide occurs after exit of the aqueous suspension of calcium hydroxide and fibers from the refiner.

\* \* \* \* \*